United States Patent Office 3,057,684
Patented Oct. 9, 1962

3,057,684
METHODS OF OBTAINING SINTERED BERYLLIUM OXIDE
Emile Pruvot, St. Jean de Maurienne, Paul Baradez, La Praz, Roger Caillat, Sevres, and Roger Pointud, Paris, France, assignors to Commissariat a l'Energie Atomique, Paris, France, a French society
No Drawing. Filed June 25, 1956, Ser. No. 593,331
Claims priority, application France June 29, 1955
4 Claims. (Cl. 23—183)

The present invention relates to methods for the obtainment of sintered beryllium oxide.

Its chief object is to provide the sintering conditions and also to permit of obtaining sintered products which are of a high purity, very regular and of a density close to the theoretical density, which is of great interest in nuclear applications.

There are known methods of obtaining sintered beryllium oxide of a good consistency which consist in starting from a beryllium hydroxide or a beryllium sulfate, drying it and calcining it, the beryllium oxide thus obtained being subsequently sintered.

The methods known up to this time have many drawbacks. In particular, calcination of a beryllium hydroxide which does not comply with particular conditions gives rise to important losses due to the fact that beryllium oxide or beryllium hydrate is carried along by the water vapor evolved by dehydration. This involves very serious difficulties due first to the low yield and also to the very expensive protection means which are made necessary by the toxicity of the beryllium compounds which are thus carried along.

Furthermore, the amorphous and alpha forms of beryllium hydroxide are very difficult to wash so that they do not permit, when they consitute the starting material, of obatining a sintered product of high purity.

Finally, the amorphous and alpha forms of beryllium hydroxide give, when calcined, oxides which it is difficult to sinter under high pressure unless they have been preliminarily calcined to very high temperature. Sintering of such oxides calls for conditions of temperature, pressure and duration which are very difficult to comply with and the sintered product that is finally obtained generally has defects such as cracks and the like.

On the contrary, the beta form of beryllium hydroxide is a dense precipitate which can easily be filtered. It can be brought, by successive washings, to a very high degree of purity.

According to our invention, the product that is subjected to the sintering operation consists of anhydrous beryllium oxide resulting from the calcination of a beryllium hydroxide at least most of which is in the beta form and mixed with a little more than 1 percent of anions of a mineral acid in the form of a beryllium salt the only residue of which, when subjected to the sintering conditions, in particular of temperature, is beryllium oxide.

Beryllium hydroxide in the beta form may be obtained, for instance, as described in the paper by A. Seitz et al. in Z. anorg. Chem., vol. 261 (1950), pages 94–97, and in the publications referred to therein.

In a first embodiment of the invention, the initial beryllium hydroxide (at least mostly of the beta form) is given the form of a paste, by addition of a mineral acid or of the beryllium salt corresponding to such an acid. These addition products may be used either in the dry state or in solution.

The salt or acid thus added is preferably chosen so that this salt or the salt resulting from the action of this acid quickly dissociates at a temperature at most equal to the temperature of total dehydration, in their presence, of beryllium hydroxide. Furthermore their only residue, when subjected to the conditions, in particular of temperature, at which sintering takes place, must be beryllium oxide.

A preferred addition product, which is particularly satisfactory, is beryllium sulfate.

The paste thus obtained is then dried and calcined either successively or in a single operation. Calcination is conducted in such manner as to leave in the beryllium oxide that is obtained some amount (more than 1%) of the anion of the incorporated salt or acid. In order to obtain this result, it is necessary to avoid too long a calcination or a calcination at too high a temperature, such that the decomposition of the added substance would be total.

According to another embodiment of the invention, the mineral acid or corresponding salt of beryllium is added directly to the beryllium oxide, in particular after calcination of the beryllium hydroxide from which it is obtained.

Beryllium oxide obtained as above stated is the product used for sintering under pressure. One of the advantages of this product is its relatively high density, which facilitates the filling of the sintering mold by said oxide in the powder form.

The addition of an acid or a beryllium salt as above described permits of conducting sintering under pressure at a temperature, a pressure, and during a time which are susbtantially lower than the temperature, pressure and time necessary for obtaining products of equivalent qualities in the absence of such an addition. Furthermore, the method according to our invention permits of obtaining sintered products of a very high density close to the theoretical density and of a very high purity so as to permit nuclear applications of such products.

These two advantages (to wit high density and high purity) are generally, in the conventional methods, incompatible with the general conditions under which a good sintering is possible (to wit temperature, pressure and duration relatively low).

The sintered products obtained by our method are of a homogeneous density whatever be the dimensions of the product; they are free from mechanical defects such as cracks, holes, etc.

Finally, the method according to our invention permits a great range of adjustment of the general conditions of sintering, which is sufficient to permit a high regularity of manufacture.

We will now describe some examples of a specific method according to our invention, these examples having no limitative character.

*Example I*

We start from 275 kg. of precipitated beryllium hydroxide filtered in the moist state and containing 95% of BeO in the beta form. We add thereto, in a mixing apparatus, 37.5 kg. of tetrahydrate beryllium sulfate.

The paste that is obtained is spread on the plates of a furnace, dried, and calcined at 1000° until its ignition loss is a little above 1%.

If an already calcined beryllium oxide is available in the pure state, we may add thereto a little more than 1% of an anion of a mineral acid in the form of a beryllium salt.

The product thus obtained is sintered under load, according to one of the known methods, at a temperature of 1780° C. and under a pressure of 170 kg. per sq. cm., for two hours. The sintered product finally obtained has a specific gravity of 2.95.

Analysis of the sintered product showed that the acid ion that was added has completely disappeared and the purity of the product was higher than that of the starting material.

Example II

We start from 164 kg. of filtered beryllium hydroxide containing 80% of BeO in the beta form and 20% in the alpha form. They are mixed with 100 kg. of a solution at 37.5% of a beryllium sulfate.

The paste thus obtained is placed in a continuous drying apparatus which delivers the dried product in a continuous fashion into a calcination furnace.

Then sintering is carried out as in the preceding example.

Example III

To 250 kg. of beryllium hydroxide in the beta form we add 160 kg. of a 14% solution of beryllium chloride in a mixing appartus in order to obtain a paste which is subsequently dried, calcined and sintered as described in the preceding examples.

What we claim is:

1. A method of preparing sintered beryllium oxide of high density and purity comprising adding a mineral acid selected from the group of hydrochloric acid and sulfuric acid to beryllium hydroxide at least 80 percent of which is in the beta form, thereby converting part of said beryllium hydroxide to the beryllium salt of said acid, heating the salt-hydroxide mixture to form a beryllium oxide containing still a little more than about 1 percent of said salt, calculated on the total mixture, and subsequently sintering the mixture, thereby obtaining sintered beryllium oxide free of said salt.

2. A method of preparing sintered beryllium oxide of high density and purity comprising adding a mineral acid selected from the group consisting of hydrochloric acid and sulfuric acid to beryllium oxide obtained by calcination of beta beryllium hydroxide at least 80 percent of which is in the beta form, heating the salt-oxide mixture to form a beryllium oxide containing still a little more than about 1 percent of said salt, calculated on the total mixture, and subsequently sintering said mixture, thereby obtaining sintered beryllium oxide free of said salt.

3. A method of preparing beryllium oxide of high density and purity comprising adding a beryllium salt of an acid selected from the group consisting of hydrochloric acid and sulfuric acid to beryllium hydroxide at least 80 percent of which is in the beta form, heating the mixture to form a beryllium oxide containing still a little more than about 1 percent of said salt, and subsequently sintering the mixture, thereby obtaining sintered beryllium oxide free of said salt.

4. A method of preparing beryllium oxide of high density and purity comprising adding a beryllium salt of a mineral acid selected from the group consisting of hydrochloric acid and sulfuric acid to beryllium oxide obtained by the calcination of beryllium hydroxide at least 80 percent of which is in the beta form, heating the mixture to form a beryllium oxide containing still a little more than about 1 percent of said salt, and subsequently sintering the mixture, thereby obtaining sintered beryllium oxide free of said salt.

References Cited in the file of this patent

UNITED STATES PATENTS

| | | |
|---|---|---|
| 2,298,800 | McKee | Oct. 13, 1942 |
| 2,504,696 | Kawecki | Apr. 18, 1950 |
| 2,647,821 | Kawecki | Aug. 4, 1953 |

FOREIGN PATENTS

| | | |
|---|---|---|
| 650,597 | Great Britain | Feb. 28, 1951 |

OTHER REFERENCES

J. W. Mellor's "Inorg. and Theo. Chem.," vol. 4, 1923 ed., pp. 224–227, Longmans, Green & Co., New York, N.Y.